United States Patent
Shin et al.

(10) Patent No.: US 8,787,276 B2
(45) Date of Patent: Jul. 22, 2014

(54) METHOD AND APPARATUS FOR ALLOCATING BANDWIDTH IN WIDEBAND WIRELESS COMMUNICATION SYSTEM

(75) Inventors: Sang-Heon Shin, Suwon (KR); Young-Ik Seo, Seoul (KR); Seong-Won Oh, Yongin (KR)

(73) Assignee: Intellectual Discovery Co., Ltd., Seoul (KR)

( * ) Notice: Subject to any disclaimer, the term of this patent is extended or adjusted under 35 U.S.C. 154(b) by 211 days.

(21) Appl. No.: 13/130,046

(22) PCT Filed: Nov. 18, 2009

(86) PCT No.: PCT/KR2009/006787
§ 371 (c)(1),
(2), (4) Date: May 18, 2011

(87) PCT Pub. No.: WO2010/058953
PCT Pub. Date: May 27, 2010

(65) Prior Publication Data
US 2011/0228739 A1     Sep. 22, 2011

(30) Foreign Application Priority Data
Nov. 18, 2008 (KR) .................. 10-2008-0114646

(51) Int. Cl.
*H04W 72/00* (2009.01)
*H04W 28/20* (2009.01)
*H04W 72/04* (2009.01)

(52) U.S. Cl.
CPC .......... *H04W 28/20* (2013.01); *H04W 72/0413* (2013.01); *H04W 72/0453* (2013.01)
USPC ............ 370/329; 370/341; 370/348; 370/443

(58) Field of Classification Search
None
See application file for complete search history.

(56) References Cited

U.S. PATENT DOCUMENTS

| | | | |
|---|---|---|---|
| 7,031,720 B2* | 4/2006 | Weerakoon et al. | 455/452.2 |
| 2007/0047553 A1* | 3/2007 | Matusz et al. | 370/395.42 |
| 2007/0097936 A1* | 5/2007 | Lee et al. | 370/338 |
| 2007/0104177 A1 | 5/2007 | Hwang et al. | |
| 2007/0115880 A1 | 5/2007 | Huh et al. | |
| 2007/0189239 A1* | 8/2007 | Lim et al. | 370/337 |

(Continued)

FOREIGN PATENT DOCUMENTS

KR     1020080056209 A     6/2008

OTHER PUBLICATIONS

International Search Report for PCT/KR2009/006787 filed on Nov. 18, 2009.
Written Opinion for PCT/KR2009/006787 filed on Nov. 18, 2009.

*Primary Examiner* — Hassan Phillips
*Assistant Examiner* — Duc Duong

(57) ABSTRACT

The present invention relates to a method and to an apparatus for allocating a bandwidth in a wideband wireless communication system. Said method comprises: allocating a bandwidth to an uplink burst area in accordance with the bandwidth request received from at least one terminal; determining whether a preemptive grant bandwidth allocation is enabled or not; determining a preemptive grant terminal if the preemptive grant bandwidth allocation is enabled; and allocating a preemptive grant bandwidth within a residual bandwidth to the determined preemptive grant terminal. By doing this, the present invention can efficiently use the bandwidth of an uplink frame, and shorten the time taken for bandwidth request/approval between a terminal and a base station.

16 Claims, 6 Drawing Sheets

(56) References Cited

U.S. PATENT DOCUMENTS

| | | |
|---|---|---|
| 2008/0056193 A1* | 3/2008 | Bourlas et al. ............... 370/331 |
| 2008/0139216 A1 | 6/2008 | Lee et al. |
| 2008/0152031 A1 | 6/2008 | Lee et al. |
| 2008/0205452 A1* | 8/2008 | Chou ............................ 370/493 |
| 2009/0109932 A1* | 4/2009 | Maheshwari et al. ........ 370/335 |
| 2009/0323602 A1* | 12/2009 | Li et al. ......................... 370/329 |
| 2010/0111012 A1* | 5/2010 | Kim et al. ..................... 370/329 |

\* cited by examiner

METHOD AND APPARATUS FOR ALLOCATING BANDWIDTH IN WIDEBAND WIRELESS COMMUNICATION SYSTEM

TECHNICAL FIELD

The present invention relates generally to a method and apparatus for allocating a bandwidth to terminal in a wideband wireless communication system, and in particular, to a method and apparatus for allocating a residual bandwidth of uplink (UL) frame to the predetermined terminal as a preemptive grant bandwidth in a wideband wireless communication system.

BACKGROUND ART

Research on a wideband wireless communication system (e.g., portable internet system, Worldwide Interoperability for Microwave Access (WiMAX) system) is being conducted to provide high speed wireless communication service in more wide area. In a wideband wireless communication system, a terminal performs ranging process, bandwidth request/grant process, etc. before transmitting data to a Base Station (BS).

FIG. 1 is a flowchart illustrating a data transmission method in a conventional wireless communication system.

As illustrated in FIG. 1, in a conventional wireless communication system, a terminal which has entered into a wireless network performs ranging by transmitting Code Division Multiple Access (CDMA) code to a BS, in order to transmit data to the BS (Step 110). Thereafter, the terminal receives a CDMA allocation Information Element (IE) from the BS (Step 120), and transmits a bandwidth request for data transmission to the BS through a channel in accordance with the CDMA allocation IE (Step 130). Then, the terminal receives a bandwidth grant corresponding to the bandwidth request from the BS (Step 140), and transmits uplink (UL) data to the BS through a bandwidth granted by the BS (Step 150).

However, in a bandwidth request/grant process according to a conventional wireless communication system, there is a problem that the terminal receives a bandwidth request from the BS after data to be transmitted occurs.

In addition, since a bandwidth request process is performed on the basis of contention, there is a problem that data transmission delay of the terminal can occur in case that the terminal has not acquired a CDMA allocation IE from the BS after transmitting a CDMA code.

DISCLOSURE

Technical Problem

Therefore, the present invention has been made in view of the above-mentioned problems, and it is an object of the present invention to provide a method and apparatus for allocating a bandwidth to reduce data transmission delay according a bandwidth request/grant process between a terminal and a BS, by allocating a preemptive grant bandwidth to arbitrary terminal before the arbitrary terminal requests bandwidth.

It is another object of the present invention to provide a method and apparatus for allocating a bandwidth to efficiently use bandwidth, by allocating a preemptive grant bandwidth using a residual bandwidth when a BS allocates UL bandwidth.

Technical Solution

According to one aspect of the present invention, there is provided a method for allocating a bandwidth in a wideband wireless communication system, the method comprising: allocating a bandwidth to an uplink burst area in accordance with a bandwidth request received from at least one terminal; determining whether a preemptive grant bandwidth allocation is enabled or not; determining a preemptive grant terminal if the preemptive grant bandwidth allocation is enabled; and allocating a preemptive grant bandwidth within a residual bandwidth to the determined preemptive grant terminal.

According to another aspect of the present invention, there is provided an apparatus for allocating a bandwidth in a wideband wireless communication system, the apparatus comprising: a preemptive grant determiner for determining whether a preemptive grant bandwidth allocation is enabled or not, based on a size of a residual bandwidth except a bandwidth allocated to an uplink burst area; a terminal determiner for determining a preemptive grant terminal to which the preemptive grant bandwidth is allocated; a preemptive grant bandwidth allocator for allocating the preemptive grant bandwidth to the preemptive grant terminal, using the residual bandwidth; and a scheduler for generating an uplink MAP containing a bandwidth allocation information about the uplink burst area and a preemptive grant bandwidth allocation information.

According to further another aspect of the present invention, there is provided an apparatus for allocating a bandwidth in a wideband wireless communication system, wherein the apparatus allocates a bandwidth to an uplink burst area in accordance with a bandwidth request received from at least one terminal; and performs a preemptive grant by allocating a preemptive grant bandwidth within a residual bandwidth for at least one terminal that does not transmit the bandwidth request, if the residual bandwidth except a pre-allocated bandwidth is present.

Advantageous Effects

The present invention can efficiently use bandwidth of UL frame and reduce processing time for bandwidth request/grant process between a terminal and a BS, since the BS allocates a residual bandwidth to a terminal as a preemptive grant bandwidth before the terminal requests bandwidth to the BS.

DESCRIPTION OF THE DRAWINGS

The above and other aspects, features and advantages of the present invention will become more apparent from the following detailed description when taken in conjunction with the accompanying drawings in which.

MODE FOR INVENTION

Figure 1:
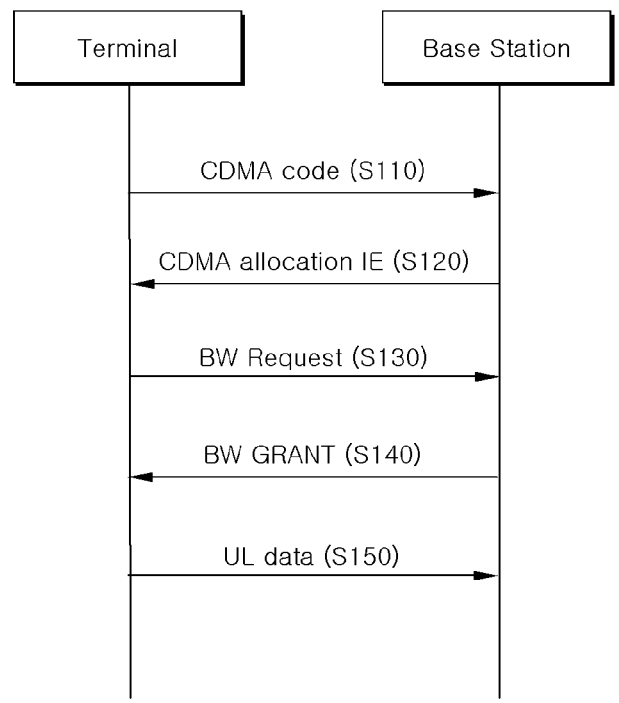
FIG. 1 is a flowchart illustrating a data transmission method in a conventional wireless communication system.

Preferred embodiments of the present invention will now be described in detail with reference to the annexed drawings.

In the drawings, the same or similar elements are denoted by the same reference numerals even though they are depicted in different drawings. In the following description, a detailed description of known functions and configurations incorporated herein has been omitted for clarity and conciseness.

Figure 2:
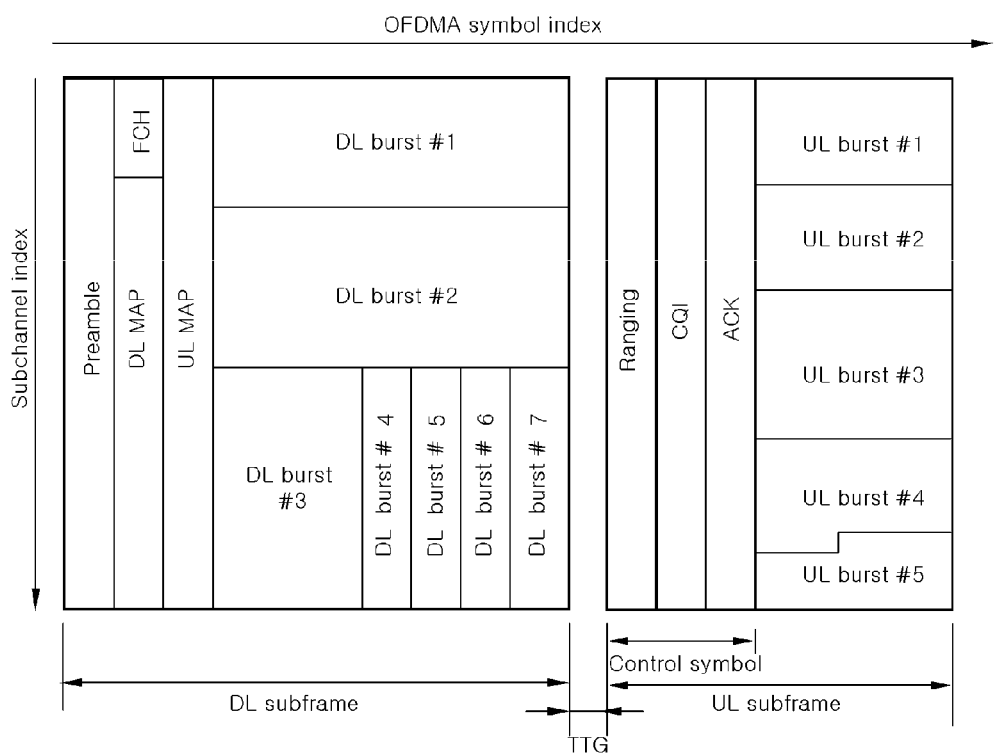
FIG. 2 is diagram illustrating a structure of a frame used in a communication system according to an embodiment of the present invention.

FIG. 2 is diagram illustrating a structure of a frame used in a communication system according to an embodiment of the present invention. For reference, the communication system in FIG. 2 is a wideband wireless communication system based on an Institute of Electrical and Electronics Engineers (IEEE) 802.16 d/e, a frame structure thereof is based on an Orthogonal Frequency Division Multiple Access (OFDMA)/Time Division Duplex (TDD) system.

Specifically, in FIG. 2, the frame is composed of a time domain and a frequency domain, wherein the resource allocation unit of the time domain is an OFDMA symbol and the resource allocation unit of the frequency domain is a subchannel. A minimum information transmission unit is composed of one OFDMA symbol and one subchannel.

In TDD system, the frame is divided into a downlink (DL) subframe generated to transmit data from a BS to a terminal, and an uplink (UL) subframe generated to transmit data from a terminal to a BS. A Transmit/receive Transition Gap (TTG) exists between DL and UL, as a guard region.

The DL subframe is composed of Preamble, Frame Control Header (FCH), DL MAP, UL MAP, and DL bursts, and the UL subframe is composed of control symbols (Ranging, Acknowledgement (ACK), and Channel Quality Indicator (MI)) and UL bursts.

Preamble of DL subframe contains synchronization information for time and frequency synchronization of a terminal, and FCH contains frame structure information for decoding DL MAP, UL MAP, etc.

DL MAP contains DL MAP IEs in which information on positions and usages of DL bursts that the BS transmits is written.

UL MAP contains UL MAP IEs in which information on positions and usages of UL bursts that the terminal transmits is written. For reference, UL MAP according to an embodiment of the present invention contains UL MAP IE in which information on preemptive grant bandwidth is written, wherein the preemptive grant bandwidth is a bandwidth that the BS has allocated in advance without receiving bandwidth request from terminal.

The BS broadcasts DL subframe of the above mentioned frame to terminals. Then, each terminal receives the DL subframe from the BS, decodes each MAP, checks a corresponding UL burst, and decodes corresponding data burst by referring to MAP.

Especially, the terminal to which preemptive grant bandwidth has allocated decodes UL MAP included in DL subframe, checks the corresponding preemptive grant bandwidth, and transmits data burst and/or bandwidth request to the BS through the preemptive grant bandwidth.

Figure 3:
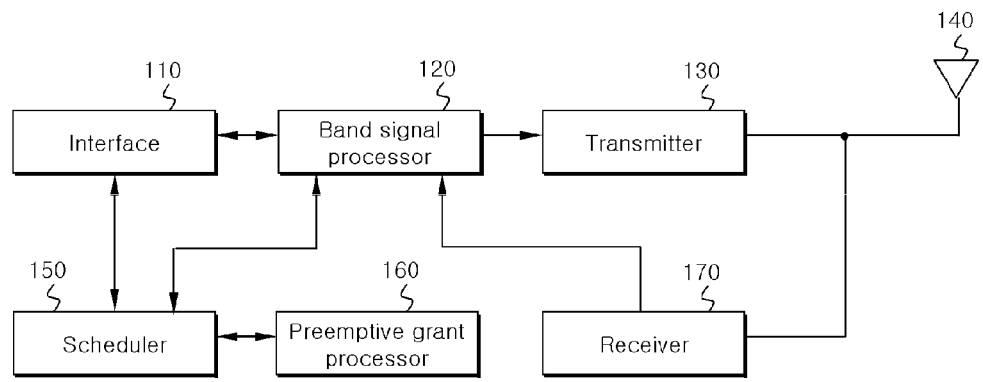
FIG. 3 is diagram illustrating a structure of a base station performing a bandwidth allocation process according to an embodiment of the present invention.
Figure 4:
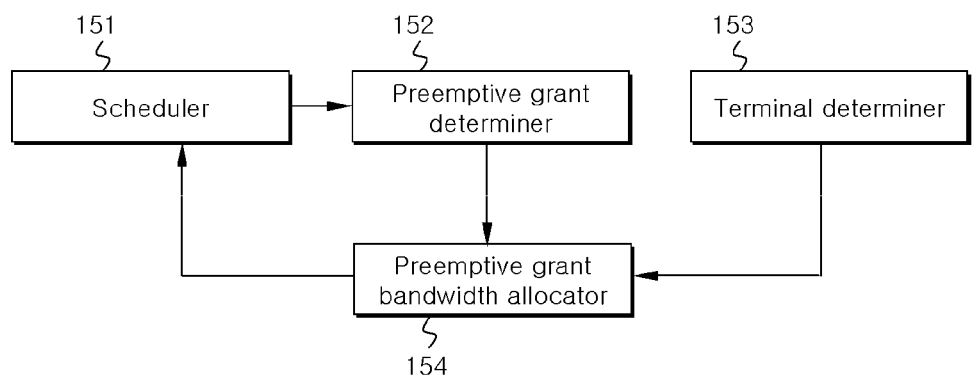
FIG. 4 is a diagram illustrating a structure of a bandwidth allocation apparatus according to an embodiment of the present invention.

With reference to FIGS. 3 and 4, a detailed description will now be made of an apparatus for performing a bandwidth allocation process according to an embodiment of the present invention.

FIG. 3 is diagram illustrating a structure of a BS performing a bandwidth allocation process according to an embodiment of the present invention.

As illustrated in FIG. 3, a BS 100 according to an embodiment of the present invention includes an interface 110, a band signal processor 120, a transmitter 130, an antenna 140, a scheduler 150, a preemptive grant processor 160, and a receiver 170. For reference, the BS 100 according to an embodiment of the present invention can support Time Division Duplex (TDD) system, and signal process of the BS 100 can divided into a reception path and a transmission path.

In the reception path, the receiver 170 receives one or more radio signals that terminals transmit, via the antenna 140, and converts the received radio signals into baseband signals. For example, the receiver 170 removes noises from the received signal, amplifies the noise-removed signal, down-converts the amplified signal into a baseband signal, and digitalizes the down-converted baseband signal. The band signal processor 120 extracts information or data bits from the digitalized signal, and performs demodulation, decoding, error correction processes thereon.

In the transmission path, the interface 100 receives voice, data and/or control information from a base station controller or radio network, and the band signal processor 120 encodes the voice, data and/or control information, and outputs the results to the transmitter 130. The transmitter 130 modulates the encoded voice, data and/or control information with a carrier signal having a desired transmission frequency or frequencies, amplifies the modulated carrier signal to a level suitable for transmission, and transmits the amplified carrier signal over the air via the antenna 140.

The scheduler 150 performs a scheduling by allocating DL MAP, UL MAP, DL bursts, and UL bursts, etc. to a frame constructed of subchannels and symbols for data transmission/reception with terminal. The scheduler 150 performs UL scheduling by allocating UL MAP containing granted bandwidth allocation information to UL subframe, in response to bandwidth allocation request received from at least one terminal.

Especially, the scheduler 150 according to an embodiment of the present invention performs the UL scheduling by allocating UL MAP further containing preemptive grant bandwidth allocation information generated by the preemptive grant processor 160, to UL subframe.

Meanwhile, the scheduler 150 performs UL scheduling in accordance with bandwidth allocation request received from at least one terminal, if the preemptive grant bandwidth generated by the preemptive grant processor 160 is not present at UL scheduling.

The preemptive grant processor 160 determines whether a preemptive grant bandwidth allocation is enabled or not, according to a result of the UL scheduling performed by the scheduler 150, and sets preemptive grant bandwidth thought which terminal can transmit data without bandwidth request/grant process, if the preemptive grant bandwidth allocation is enabled. In this case, the preemptive grant processor 160 can determine that the preemptive grant bandwidth allocation is enabled, if a residual bandwidth which is more than the predetermined size is present in the UL bandwidth at the result of UL scheduling by the scheduler 150.

Also, the preemptive grant processor 160 sets the residual bandwidth of UL burst area as a preemptive grant bandwidth if the preemptive grant bandwidth allocation is enabled, and allocates the preemptive grant bandwidth to at least one terminal which is selected according to the predetermined criterion.

Then, the preemptive grant processor 160 transmits preemptive grant bandwidth allocation information containing preemptive grant bandwidth information and preemptive grant terminal information, to the scheduler 150.

In FIG. 3, it is disclosed that the scheduler 150 and the preemptive grant processor 160 which are included in the BS 100 perform a preemptive grant bandwidth allocation process according to an embodiment of the present invention. However, the scheduler 150 and the preemptive grant processor 160 can be provided as a separate bandwidth allocation apparatus in communication system.

FIG. 4 is a diagram illustrating a structure of a bandwidth allocation apparatus according to an embodiment of the present invention.

As illustrated in FIG. 4, the bandwidth allocation apparatus according to an embodiment of the present invention includes a scheduler 151, a preemptive grant determiner 152, a terminal determiner 153, and a preemptive grant bandwidth allocator 154. For reference, the bandwidth allocation apparatus according to an embodiment of the present invention is can be included in a BS or be provided as a separate apparatus in communication system.

The scheduler 151 performs first UL scheduling process in which bandwidth of UL burst area is allocated to each terminal in accordance with bandwidth request received from at least one terminal, and transmits UL burst allocation information (i.e., first UL burst allocation information) based on scheduling result to the preemptive grant determiner 152.

Also, the scheduler 151 receives preemptive grant bandwidth allocation information from the preemptive grant bandwidth allocator 154, and performs second UL scheduling process in which the first UL burst allocation information and preemptive grant bandwidth allocation information are reflected.

That is, the scheduler 151 performs scheduling so that UL MAP IEs constituting UL MAP of DL subframe illustrated in FIG. 2 can further include preemptive grant bandwidth allocation information containing preemptive grant bandwidth information and corresponding terminal identification information.

Also, the scheduler 151 performs DL scheduling process in which DL bursts are allocated to DL subframe, wherein DL bursts are received from BS controller or radio network. Especially, the scheduler 151 according to an embodiment of the present invention performs DL scheduling process in consideration of size of UL MAP IEs which are generated as a result of the second UL scheduling process.

The preemptive grant determiner 152 calculates a size of bandwidth for the pre-allocated UL bursts using the first UL burst allocation information, and calculates a size of residual bandwidth by calculating a difference between the size of total bandwidth of UL subframe for current scheduling and the size of bandwidth for the pre-allocated UL bursts.

Then, the preemptive grant determiner 152 transmits the size of residual bandwidth and position information (i.e., information on symbols and subchannels) of residual bandwidth in UL burst area, to the preemptive grant bandwidth allocator 154.

The terminal determiner 153 determines terminal to which preemptive grant bandwidth will be allocated (i.e., preemptive grant terminal) among one or more registered terminals based on the predetermined criterion, and transmits terminal identification information for preemptive grant terminal to the preemptive grant bandwidth allocator 154. For reference, Connection Identifier (CID) which is determined at registering preemptive grant terminal in wireless communication system is used as terminal identification information, wherein the Connection Identifier (CID) includes a MAC address of the preemptive grant terminal.

For example, the terminal determiner 153 determines the preemptive grant terminal based on a criterion for terminal priority order determination which reflects on user grade information, usage state and usage period information for preemptive grant bandwidth, current service class information, ARQ response processing state information, and ranging request state information, etc. for one or more registered terminals.

In particular, the terminal determiner 153 receives request of information on preemptive grant terminal from the preemptive grant bandwidth allocator 154, and determines preemptive grant terminal based on the predetermined criterion. In this case, the terminal determiner 153 can determine at least one preemptive grant terminal based on the priority order according to the predetermined criterion, and transmit identification information on the determined preemptive grant terminal to the preemptive grant bandwidth allocator 154.

In one example, if the predetermined criterion relates to the user grade information, the terminal determiner 153 checks user grade information for terminals which are positioned within a range of the bandwidth allocation available at present (i.e., terminals which are connected at present), among user grade information for the total registered terminals. Then, the terminal determiner 153 determines preemptive grant terminal from a terminal in which user grade is highest, in order, among one or more terminals for which user grade have been checked.

In another example, if the predetermined criterion relates to the usage state and usage period information for preemptive grant bandwidth, the terminal determiner 153 determines a terminal which actually transmits data using preemptive grant bandwidth allocated to the UL subframe, as a preemptive grant terminal, among one or more terminals to which preemptive grant bandwidth have been allocated at UL scheduling.

In further another example, if the predetermined criterion relates to the current service class information, the terminal determiner 153 determines a preemptive grant terminal based on bandwidth usage purpose included in bandwidth request from arbitrary terminal at former UL scheduling. For reference, service classes are classified into Unsolicited Grant Service (UGS), Real Time Polling Service (rtPS), non-Real Time Polling Service (nrtPS), Extended Real Time Polling Service (ertPS), and Best Effort Service (BES), etc. according to usage purpose of bandwidth that the arbitrary terminal requests.

In this case, the terminal determiner 153 can divide service classes of terminal into real time service class and non-real time service class, and determine a terminal which transmits burst data relevant to the real time service class at the former UL subframe, as a preemptive grant terminal. Also, the terminal determiner 153 can determine a terminal which transmits burst data relevant to a specific service class at the former UL subframe, as a preemptive grant terminal.

Meanwhile, in further another example, if the predetermined criterion relates to the ARQ response processing state information, the terminal determiner 153 determines a terminal which transmits ARQ response corresponding to the former DL subframe through the former UL subframe, as the preemptive grant terminal.

Also, in further another example, if the predetermined criterion relates to the ranging request state information, the terminal determiner 153 determines a terminal which has not been determined to a terminal being going to receive CDMA allocation IE at first UL scheduling, among one or more terminals which have transmitted CDMA code, as the preemptive grant terminal.

Similarly, the terminal determiner 153 determines priority order of preemptive grant terminal based on various criteria. In a case, the terminal determiner 153 sets some one criterion of priority order for preemptive grant terminal determination among criteria as mentioned above. Also, the terminal determiner 153 decides the ranking about various criteria, and reflects plural criteria to determine preemptive grant terminal. Also, the terminal determiner 153 sets that criterion of priority order for preemptive grant terminal determination is same or different at every frame.

For example, the terminal determiner 153 sets user grade of terminal as a criterion of priority order for preemptive grant terminal determination at former UL scheduling, and sets usage state and usage period for preemptive grant bandwidth and current service class as criteria of priority order for preemptive grant terminal determination at current UL scheduling.

In this case, the terminal determiner 153 checks at least one terminal which transmits data through preemptive grant bandwidth of UL subframe of the former frame, among one or more terminals which have been determined to preemptive grant terminal according to user grade at the former UL scheduling, and determines preemptive grant terminal from a terminal of which user grade is highest, in order, among the checked terminals at current scheduling In this way, it is possible to provide faster data transmission/reception service to specific terminals by determining preemptive grant terminal based on at least one criterion. Also, it is possible to efficiently allocate preemptive grant bandwidth by allocating preemptive grant bandwidth based on preemptive grant bandwidth usage ability of terminal.

The preemptive grant bandwidth allocator 154 sets preemptive grant bandwidth from among UL burst area using size and position information of residual bandwidth received from the preemptive grant determiner 152, acquires preemptive grant terminal information from the terminal determiner 153, and allocates preemptive grant bandwidth to the corresponding terminal. In this case, the preemptive grant bandwidth allocator 154 sets at least one preemptive grant bandwidth in accordance with a size of residual bandwidth, and allocates preemptive grant bandwidth to at least one preselected terminal.

Specifically, the preemptive grant bandwidth allocator 154 determines whether the residual bandwidth can be set into two or more preemptive grant bandwidth or not by comparing the size of the residual bandwidth with the size of the reference bandwidth. If the size of the residual bandwidth is more than the size of the reference bandwidth, the preemptive grant bandwidth allocator 154 can set maximum number of preemptive grant bandwidths which can be included in the residual bandwidth, based on the size of the reference bandwidth. For reference, the size of the reference bandwidth can be set to a size of the bandwidth request header, wherein the bandwidth request header is used when terminal requests a bandwidth allocation to BS in wireless communication system.

Meanwhile, the preemptive grant bandwidth allocator 154 can allocate a bandwidth for reception of bandwidth request header from terminal as the preemptive grant bandwidth, and also allocate a bandwidth for reception of data burst from terminal as the preemptive grant bandwidth.

The preemptive grant bandwidth allocator 154 requests information about preemptive grant terminal to the terminal determiner 153, and acquires at least one terminal identification information in response of that. In this case, the preemptive grant bandwidth allocator 154 can transmit request for terminal information containing usage purpose information of the preemptive grant bandwidth (e.g., information about whether usage purpose relates bandwidth request header reception or data burst reception) to the terminal determiner 153. Then, the terminal determiner 153 can set a criterion of priority order for terminal selection considering the usage purpose information of the preemptive grant bandwidth.

The preemptive grant bandwidth allocator 154 generates preemptive grant bandwidth allocation information by matching position information of preemptive grant bandwidth with terminal identification information, and transmits the generated preemptive grant bandwidth allocation information to the scheduler 151.

Meanwhile, if the size of the residual bandwidth is less than the size of the reference bandwidth, the preemptive grant bandwidth allocator 154 determines that preemptive grant bandwidth allocation is not enabled and transmits information that preemptive grant bandwidth allocation is impossible, to the scheduler 151. In this case, scheduler 151 dose not perform the second UP scheduling process in which preemptive grant bandwidth allocation information is generated, and performs scheduling process so that UL burst allocation information as a result of the first UP scheduling can be included in UP MAP.

Figure 5:
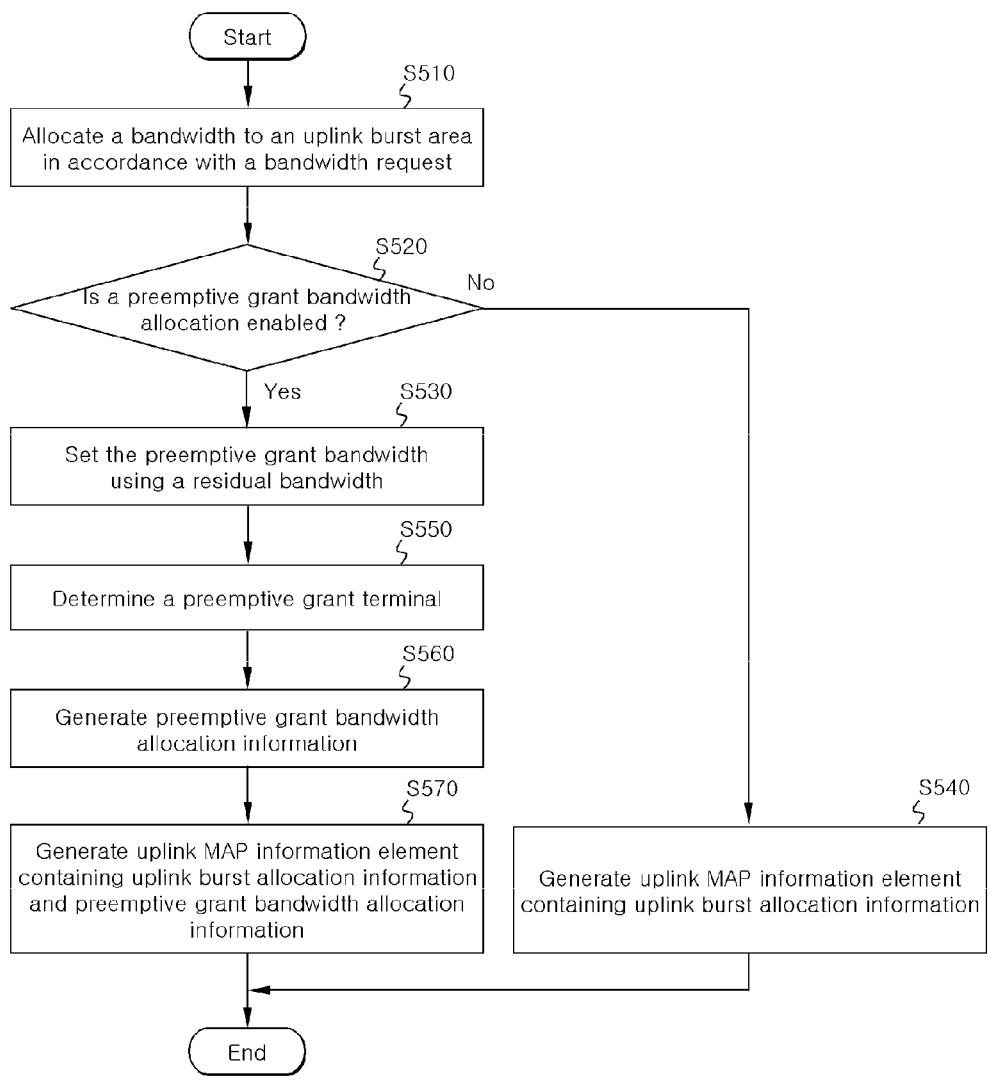
FIG. 5 is a flowchart illustrating a bandwidth allocation method according to an embodiment of the present invention.
Figure 6:
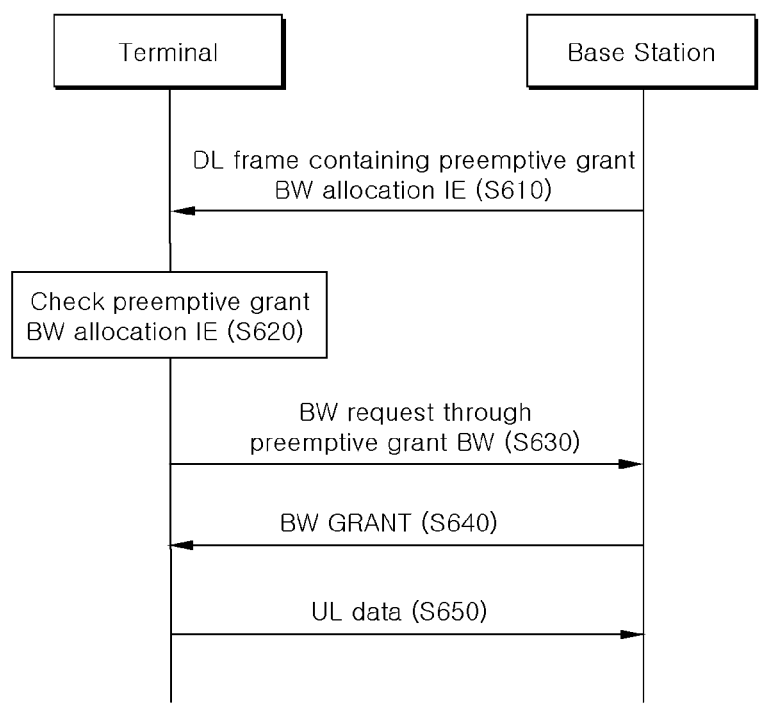
FIG. 6 is a flowchart illustrating a data transmission method according to an embodiment of the present invention.

With reference to FIGS. 5 and 6, a detailed description will now be made of a method for preemptive grant bandwidth allocation and a method for data transmission using the preemptive grant bandwidth according to an embodiment of the present invention.

FIG. 5 is a flowchart illustrating a bandwidth allocation method according to an embodiment of the present invention.

Referring to FIG. 5, a BS allocates a bandwidth to UL burst area in accordance with bandwidth request received from at least one terminal (Step S510). In this case, the BS can receive the bandwidth request by receiving ranging request containing CDMA code from at least one terminal and transmitting CDMA allocation IE to arbitrary terminal in accordance with the ranging request, before allocating the bandwidth for UL burst.

The arbitrary terminal can be determined on the basis of contention from among at least one terminal which transmits the ranging request, and separately store information about terminal to which CDMA allocation IE is transmitted and information about terminal to which CDMA allocation IE is not transmitted. The information about terminal according to whether CDMA allocation IE in accordance with the ranging request is transmitted or not, can be used as a criterion for ranging request state of terminal at determining priority order of preemptive grant terminal hereafter.

Thereafter, the BS determines whether a preemptive grant bandwidth allocation is enabled or not, based on the size of the bandwidth which was allocated to the UL burst area in the Step 510 (Step 520). For reference, the BS determines that a preemptive grant bandwidth allocation is enabled if the size of the residual bandwidth is more than the size of a reference bandwidth, wherein the residual bandwidth is remainder excepting bandwidth for the pre-allocated UL burst among bandwidth for total UL burst. In this case, the size of the reference bandwidth is a minimum size of preemptive grant bandwidth, and can be set a size of bandwidth request header used in wireless communication system.

As a result of the determination in Step 520, if the preemptive grant bandwidth allocation is enabled, the BS sets at least one preemptive grant bandwidth using the residual bandwidth (Step 530). In this case, the BS can set maximum number of preemptive grant bandwidth which can be included in the residual bandwidth, if the size of the residual bandwidth is more than the size of a reference bandwidth.

For reference, the preemptive grant bandwidth is bandwidth which is allocated without bandwidth request from terminal. Terminal can transmit bandwidth request header or data burst within a size of preemptive grant bandwidth, using preemptive grant bandwidth.

However, as a result of the determination in Step 520, if the preemptive grant bandwidth allocation is not enabled, the BS generates UL MAP IEs containing information about bandwidth which is allocated for the UL bursts in Step 510 (Step 540). The BS schedules UL MAP to be included in DL subframe by generating UL MAP IEs containing UL burst information without allocating preemptive grant bandwidth, in case that the preemptive grant bandwidth allocation is not enabled.

Meanwhile, the BS determines at least one terminal to which at least one preemptive grant bandwidth is allocated based on the predetermined criterion after setting at least one preemptive grant bandwidth in Step 530 (Step 550). In this case, preemptive grant terminal can be determined based on criterion for the terminal priority order determination which reflects on user grade information, usage state and usage period information for preemptive grant bandwidth, current service class information, ARQ response processing state information, and ranging request state information, etc.

Thereafter, the BS generates preemptive grant bandwidth allocation information containing identification information for at least one determined terminal and position information for the corresponding preemptive grant bandwidth (Step 560).

Then, the BS generates UL MAP IEs containing information on UL burst which was allocated in Step 510 and preemptive grant bandwidth allocation information, and schedules UL MAP to be included in DL subframe.

FIG. 6 is a flowchart illustrating a data transmission method according to an embodiment of the present invention.

Referring to FIG. 6, a BS transmits DL frame containing preemptive grant bandwidth allocation IE (Step 610). For reference, the preemptive grant bandwidth is bandwidth which has been allocated without bandwidth request from terminal, and can be set more than bandwidth request header.

Then, the terminal which receives DL frame checks whether the corresponding preemptive grant bandwidth allocation information is included in UL MAP of DL frame. In this case, preemptive grant terminal can receive DL frame, and check whether the corresponding preemptive grant bandwidth is present, by checking preemptive grant bandwidth allocation information included in each DL frame.

Thereafter, if the corresponding preemptive grant bandwidth allocation information is included in UL MAP, the preemptive grant terminal transmits bandwidth request to the BS through the preemptive grant bandwidth (Step 630). In this case, preemptive grant terminal can transmit bandwidth request header for data transmission.

Meanwhile, in a data transmission method according to an embodiment of the present invention, the preemptive grant terminal transmits bandwidth request header corresponding to the data to be transmitted, through the preemptive grant bandwidth. However, the preemptive grant terminal directly transmits data if a size of data to be transmitted is less than a size of preemptive grant bandwidth.

Thereafter, the BS which has received bandwidth request through preemptive grant bandwidth allocates bandwidth to the preemptive grant terminal by transmitting a bandwidth grant corresponding to the bandwidth request (Step 640).

Then, the preemptive grant terminal transmits the corresponding data through the allocated bandwidth (Step 650). That is, the preemptive grant terminal receives DL frame containing UL MAP in which preemptive grant bandwidth allocation information is included, and transmits the corresponding data though the preemptive grant bandwidth at the next UL frame.

As mentioned above, according to the present invention, since a BS previously allocates preemptive grant bandwidth to a terminal before the terminal requests bandwidth allocation, time delay caused by the bandwidth request and grant process can be decreased.

While the invention has been shown and described with reference to a certain preferred embodiment thereof, it will be understood by those skilled in the art that various changes in form and details may be made therein without departing from the spirit and scope of the invention as defined by the appended claims.

The invention claimed is:

1. A method for allocating a bandwidth in a wideband wireless communication system, the method comprising:
   allocating a bandwidth to an uplink burst area in accordance with a bandwidth request received from at least one terminal;
   determining whether a preemptive grant bandwidth allocation is enabled or not;
   determining a preemptive grant terminal if the preemptive grant bandwidth allocation is enabled; and
   allocating a preemptive grant bandwidth within a residual bandwidth of the uplink burst area to the determined preemptive grant terminal,
   wherein the step of determining whether a preemptive grant bandwidth allocation is enabled or does not comprise:
      calculating a size of the residual bandwidth except the bandwidth allocated to the uplink burst area; and
      determining that the preemptive grant bandwidth allocation is enabled if the size of the residual bandwidth is more than a size of a reference bandwidth.

2. The method of claim 1, further comprising:
   transmitting an uplink MAP containing a bandwidth allocation information about the uplink burst area and a preemptive grant bandwidth allocation information containing a terminal identification information about the determined preemptive grant terminal and a preemptive grant bandwidth information.

3. The method of claim 2, further comprising:
   receiving data from the determined preemptive grant terminal at next frame to the frame containing the uplink MAP.

4. The method of claim 1, wherein the step of determining that the preemptive grant bandwidth allocation is enabled comprises:
   determining that the preemptive grant bandwidth allocation is enabled if the size of the residual bandwidth is more than a size of a bandwidth request header.

5. The method of claim 1, wherein the determination of the preemptive grant terminal is performed based on at least one of user grade information, usage state and usage period information for preemptive grant bandwidth, current service class information, ARQ response processing state information, and ranging request state information.

6. The method of claim 1, prior to the step of allocating a bandwidth to an uplink burst area, further comprising:
   transmitting a bandwidth allocation Information Element (IE) for a bandwidth request header in accordance with a ranging request received from at least one terminal; and
   receiving a bandwidth request corresponding to the bandwidth allocation Information Element (IE) for the bandwidth request header.

7. The method of claim 6, wherein the preemptive grant terminal is selected from among terminals which are not related to the bandwidth allocation Information Element (IE) for the bandwidth request header.

8. The method of claim 1, after the step of determining whether a preemptive grant bandwidth allocation is enabled or not, further comprising:
transmitting an uplink MAP which is generated based on a bandwidth being allocated to the uplink burst area.

9. An apparatus for allocating a bandwidth in a wideband wireless communication system, the apparatus comprising:
a preemptive grant determiner for determining whether a preemptive grant bandwidth allocation is enabled or not, based on a size of a residual bandwidth other than a bandwidth allocated to an uplink burst area;
a terminal determiner for determining a preemptive grant terminal to which the preemptive grant bandwidth is allocated;
a preemptive grant bandwidth allocator for allocating the preemptive grant bandwidth to the preemptive grant terminal, using the residual bandwidth; and
a scheduler for generating an uplink MAP containing a bandwidth allocation information about the uplink burst area and a preemptive grant bandwidth allocation information,
wherein the preemptive grant determiner determines that the preemptive grant bandwidth allocation is enabled if the size of the residual bandwidth is more than a size of a reference bandwidth.

10. The apparatus of claim 9, wherein the terminal determiner determines the preemptive grant terminal based on at least one of user grade information, usage state and usage period information for preemptive grant bandwidth, current service class information, ARQ response processing state information, and ranging request state information.

11. The apparatus of claim 9, wherein the preemptive grant bandwidth allocator generates the preemptive grant bandwidth allocation information containing a terminal identification information about the determined preemptive grant terminal and a preemptive grant bandwidth information.

12. The apparatus of claim 9, wherein the terminal determiner determines a terminal which is not included in the bandwidth information for a bandwidth request header, as the preemptive grant terminal.

13. The apparatus of claim 9, wherein the terminal determiner determines a terminal which transmits data of a specific service class through an uplink burst which is allocated to a former uplink frame, as the preemptive grant terminal.

14. The apparatus of claim 9, wherein the bandwidth allocated to the uplink burst area is a bandwidth which is allocated in response to a bandwidth request from a former granted terminal.

15. The apparatus of claim 9, wherein the preemptive grant determiner determines that the preemptive grant bandwidth allocation is enabled if the size of the residual bandwidth is more than a size of a bandwidth request header.

16. The apparatus of claim 9, wherein the scheduler generates the uplink MAP containing the bandwidth allocation information about the uplink burst area if the preemptive grant determiner determines that the preemptive grant bandwidth allocation is not enabled.

* * * * *